(12) United States Patent
Roth et al.

(10) Patent No.: US 11,008,017 B2
(45) Date of Patent: May 18, 2021

(54) SYSTEM FOR A VEHICLE AND COMMUNICATION METHOD

(71) Applicant: Harman Becker Automotive Systems GmbH, Karlsbad (DE)

(72) Inventors: Hans Roth, Karlsruhe (DE); Olaf Preissner, Kirchheim unter Teck (DE); Christoph Reifenrath, Erftstadt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 528 days.

(21) Appl. No.: 14/654,441

(22) PCT Filed: Dec. 19, 2013

(86) PCT No.: PCT/EP2013/003862
§ 371 (c)(1),
(2) Date: Jun. 19, 2015

(87) PCT Pub. No.: WO2014/095069
PCT Pub. Date: Jun. 26, 2014

(65) Prior Publication Data
US 2015/0358471 A1    Dec. 10, 2015

Related U.S. Application Data

(60) Provisional application No. 61/745,229, filed on Dec. 21, 2012.

(51) Int. Cl.
*H04M 3/00* (2006.01)
*H04B 7/00* (2006.01)
(Continued)

(52) U.S. Cl.
CPC ............ *B60W 50/10* (2013.01); *B60K 35/00* (2013.01); *B60K 37/00* (2013.01); *B60Q 9/008* (2013.01);
(Continued)

(58) Field of Classification Search
CPC .......... G01C 21/3661; G01C 21/3688; H04M 1/6075; G08G 1/01
(Continued)

(56) References Cited

U.S. PATENT DOCUMENTS 8,478,518 B2 *  7/2013  Nagase ................... G08G 1/01
                                                      701/117
8,594,654 B2 * 11/2013  Weyl .................. G01C 21/3661
                                                    340/426.13
(Continued)

FOREIGN PATENT DOCUMENTS

CN          1863257 A  * 11/2006

OTHER PUBLICATIONS

ISA European Patent Office, International Search Report Issued in International Application No. PCT/EP2013/003862, dated Jul. 2, 2014, WIPO, 3 pages.
(Continued)

*Primary Examiner* — Gary Lafontant
(74) *Attorney, Agent, or Firm* — McCoy Russell LLP (57) ABSTRACT

Embodiments are disclosed for systems for a vehicle. An example system for a vehicle includes a central unit and an input device,
wherein the central unit has a first interface for connecting to a first mobile device and a second interface for connecting to a second mobile device,
wherein the central unit is configured to assign the first mobile device to a driver and the second mobile device to a passenger in the vehicle,
wherein the central unit is configured to output information on a call directed to the first mobile device,
wherein the central unit is configured to detect an input by means of the input device during the outputting of information, and (Continued)

wherein the central unit is configured, based on the detection of the input, to redirect the call to the second mobile device.

13 Claims, 5 Drawing Sheets (51) Int. Cl.
| | |
|---|---|
| B60W 50/10 | (2012.01) |
| G02B 27/01 | (2006.01) |
| B60R 11/02 | (2006.01) |
| H04N 9/31 | (2006.01) |
| B60K 35/00 | (2006.01) |
| B60Q 9/00 | (2006.01) |
| H04M 3/54 | (2006.01) |
| H04M 1/60 | (2006.01) |
| H04W 4/80 | (2018.01) |
| H04N 13/243 | (2018.01) |
| H04N 13/279 | (2018.01) |
| H04N 13/282 | (2018.01) |
| B60K 37/00 | (2006.01) |
| G01C 21/36 | (2006.01) |
| H04W 4/16 | (2009.01) |
| G08G 1/00 | (2006.01) |
| G08G 1/0962 | (2006.01) |
| G06F 3/01 | (2006.01) |
| G06F 3/0481 | (2013.01) |
| H04N 13/363 | (2018.01) |
| H04W 4/40 | (2018.01) |
| H04N 101/00 | (2006.01) |

(52) U.S. Cl.
CPC ........ *B60R 11/0229* (2013.01); *G01C 21/365* (2013.01); *G02B 27/01* (2013.01); *G02B 27/0101* (2013.01); *G06F 3/013* (2013.01); *G06F 3/017* (2013.01); *G06F 3/0481* (2013.01); *G08G 1/00* (2013.01); *G08G 1/09623* (2013.01); *H04M 1/6075* (2013.01); *H04M 3/543* (2013.01); *H04N 9/31* (2013.01); *H04N 13/243* (2018.05); *H04N 13/279* (2018.05); *H04N 13/282* (2018.05); *H04N 13/363* (2018.05); *H04W 4/16* (2013.01); *H04W 4/40* (2018.02); *H04W 4/80* (2018.02); *B60K 2370/146* (2019.05); *B60K 2370/155* (2019.05); *B60K 2370/16* (2019.05); *B60K 2370/182* (2019.05); *B60K 2370/27* (2019.05); *B60K 2370/334* (2019.05); *G02B 2027/014* (2013.01); *G02B 2027/0138* (2013.01); *G02B 2027/0141* (2013.01); *G06F 2203/04804* (2013.01); *H04N 2101/00* (2013.01)

(58) Field of Classification Search
USPC .................................. 340/426.13; 701/414, 2
See application file for complete search history.

(56) References Cited

U.S. PATENT DOCUMENTS

| | | | |
|---|---|---|---|
| 8,841,929 B2* | 9/2014 | Bennett | B62D 1/06 324/600 |
| 2004/0214596 A1 | 10/2004 | Lee | |
| 2004/0252027 A1 | 12/2004 | Torkkola et al. | |
| 2011/0105097 A1* | 5/2011 | Tadayon | H04M 3/53 455/418 |
| 2011/0153118 A1* | 6/2011 | Lim | H04M 1/72533 701/2 |
| 2012/0142367 A1 | 6/2012 | Przybylski | |
| 2013/0208938 A1* | 8/2013 | Midha | A41D 1/002 381/333 |

OTHER PUBLICATIONS

IPEA European Patent Office, International Preliminary Report on Patentability Issued in Application No. PCT/EP2013/003862, Report Completed Mar. 26, 2015, WIPO, 6 pages.

* cited by examiner

SYSTEM FOR A VEHICLE AND COMMUNICATION METHOD

CROSS REFERENCE TO RELATED APPLICATIONS

The present application is a U.S. National Phase of International Patent Application Serial No. PCT/EP/2013/003862, entitled "SYSTEM FOR A VEHICLE AND COMMUNICATION METHOD," filed on Dec. 19, 2013, which claims priority to U.S. Provisional Patent Application No. 61/745,229, entitled "INFOTAINMENT SYSTEM," filed on Dec. 21, 2012, the entire contents of each of which are hereby incorporated by reference for all purposes.

TECHNICAL FIELD

The present invention relates to a system for a vehicle and a communication method.

BACKGROUND AND SUMMARY

Ad hoc call redirection is a performance feature of a service, which in an ISDN system is also called call deflection or call forwarding during the calling phase. In active ad hoc call redirection, the called party can redirect the caller during the call (ring signal). The redirection occurs at the office (switching center). The caller has no effect on the redirection.

The SIM access profile (SAP, Wikipedia), as well as the remote SIM access profile (rSAP), is a Bluetooth data transmission protocol, which is used primarily in mobile telephones. It is possible for this reason that a mobile phone built into a motor vehicle provides by means of Bluetooth a connection to a SIM card (SIM: subscriber identity module) of a Bluetooth-capable mobile phone. The mobile telephone is then in the so-called standby mode, which puts only a minimal strain on the battery of the mobile telephone. Starting at this time, the access data on the SIM card (in principle the network access authorization according to the specific mobile telephone contract) are used by the car telephone with its own GSM transmitting and receiving unit. Telephone calls and messages are transmitted over the vehicle antenna of the car telephone.

The hands-free profile is installed in the overwhelming majority of hands-free kits. Here, the antenna of the mobile telephone is used when making a call with Bluetooth; this should be evaluated as disadvantageous in regard to receiving properties. Automobile manufacturers therefore offer a so-called snap-in adapter for current mobile telephones; this adapter connects the telephone to the vehicle antenna and also charges the battery.

The object of the invention is to improve a system for a vehicle.

Said object is attained by a system with the features of independent claim 1. Advantageous refinements are the subject of dependent claims and included in the description.

Accordingly, a system for a vehicle is provided. The system comprises a central unit and an input device.

The central unit has a first interface for connecting to a first mobile device. The central unit has a second interface for connecting to a second mobile device. The first mobile device may be connectable to a mobile communications network. The second mobile device may be connectable to the mobile communications network. The mobile communications network may use a communication standard, like GSM, UMTS or LTE, so that the first mobile device and the second mobile device can also be used without the central unit of the system of the vehicle.

The central unit is configured to assign the first mobile device to a driver and the second mobile device to a passenger in the vehicle.

The central unit is configured to output information on a call directed to the first mobile device at least in the calling phase.

The central unit is configured to detect an input by means of the input device during the outputting of information. The input device in this case may have one or more input elements.

The central unit is configured, based to the detection of the input, to redirect the call to the second mobile device. The redirection is therefore call-specific and may also called ad hoc call redirection.

The object of the invention further is to provide an improved communication method for a vehicle.

Said object is attained by the method with the features of independent claim 15. Advantageous refinements are included in the description.

Accordingly, a communication method for a vehicle is provided. The method has the steps:
  connecting a central unit to a first mobile device via a first interface,
  connecting the central unit to a second mobile device via a second interface,
  assigning the first mobile device to a driver by means of the central unit,
  assigning the second mobile device to a passenger by means of the central unit,
  outputting information on a call directed to the first mobile device at least during the calling phase by the central unit,
  detecting an input by means of the input device during the outputting of information by the central unit, and
  redirecting the call to the second mobile device based on the detection of the input by the central unit.

The refinements described hereinafter refer both to the system and to the communication method. In this regard, the functions of the system can be represented in process steps.

According one embodiment, the system may have a first near field communication device and a second near field communication device. Near field communication (abbreviated as NFC) is an international transmission standard for contactless exchange of data by radio technology over short distances of a few centimeters and at a data transmission rate of a maximum of 424 kbit/s. The near field communication device may be made as an active transmitter.

The central unit may be configured to assign the first mobile device, coupled to the first near field communication device, to the driver in the vehicle. Moreover, the central unit may be configured to assign the second mobile device, coupled to the second near field communication device, to the passenger in the vehicle. An especially simple and intuitive assignment can therefore occur by the coupling. In the case of a greater number of passenger seats, a corresponding number of second near field communication devices may be provided.

The first near field communication device may be positioned toward a first retainer for the first mobile device. The second near field communication device may be positioned toward a second retainer for the second mobile device. The near field communication device may be arranged adjacent to a tray of the retainer in order to assure good coupling. The retainer may be a snap-in device which enables the charging of the mobile device in synergy.

According to one embodiment, the central unit may be configured to output a first item for the first mobile device connected via the first interface. The central unit may be configured to output a second item for the second mobile device connected via the second interface. The first mobile device may be coupled to a first Bluetooth transceiver of the central unit. The second mobile device may be coupled to a second Bluetooth transceiver of the central unit. The output first item and the output second item may be shown graphically on a display. The display may be made as a touchscreen. The central unit may be configured to detect a confirmation input of the assignment of the first item to the driver and the second item to the passenger. The confirmation input may occur by selecting the first item "driver cell phone" by touching the item on the touchscreen.

According to one embodiment, the central unit may be configured by means of location to assign the first mobile device to the driver and the second mobile device to the passenger. By means of a transmitter in the area of the driver a transit time measurement of the radio signal may be made and the relative position of the first and second mobile device may be determined from the transit time. The first mobile device, which may be positioned closer to the driver, may be assigned to the driver in the vehicle. The second mobile device, which may positioned further away than the first mobile device, may be assigned to the passenger in the vehicle. The transit time measurement may be provided in the Bluetooth or Zigbee standard.

According to one embodiment, the central unit may be configured to assign the first mobile device to the driver by means of signaling via a first cable connection of the first interface and the second mobile device to the passenger by means of signaling via a second cable connection of the second interface. The first cable connection in this case may be run to a first retainer of the driver, for example, in the form of a charging cradle. The second cable connection in this case may be run to a second retainer of the passenger (front seat passenger), for example, in the form of a charging cradle.

According to one embodiment, the central unit may be configured to output call information to a display as graphical data. The information may include the telephone number of the caller and/or a symbol (telephone handset) for the call. In addition, a picture of the caller can be obtained from the telephone number from the digital telephone directory. The display may be configured for the graphical illustration of the information. The display may be a central display in the dashboard or a head-up display.

According to one embodiment, the central unit may be configured to output the call information to a loudspeaker as an audio signal. A call tone may be output as an audio signal. It is also possible to output the spoken name of the caller as an audio signal by speech synthesis.

According to one embodiment, the central unit may be configured to change the information after redirection of the call. The driver may be informed by the change that the redirection is successful. To change the information, an item within an image may be moved and/or its size may be changed and/or its degree of transparency may be changed and/or the color may be changed. In the case of redirection to a passenger, the item of information may be made smaller and moved within the image on the display to the right in the direction of the passenger. The redirection may be indicated by a symbol.

According to one embodiment, the input device may have a sensor for contactless input. The sensor may be an infrared sensor. The sensor may be arranged in the dashboard of the vehicle. A sensitivity of the sensor may be directed toward the steering wheel. The central unit may be configured to differentiate between a steering movement and an input gesture for redirection.

According to an alternative embodiment, the input device may have a button, and/or a microphone (voice recognition), and/or a camera (gesture recognition), and/or a touchscreen for input.

According to one embodiment, the first interface may be configured for a first wireless connection to the first mobile device. The second interface may be configured for a second wireless connection to the second mobile device. The interface may have an antenna for the wireless connection. A circuit of the central unit to form the wireless interface may have a first Bluetooth transceiver for connecting to the first mobile device and a second Bluetooth transceiver for connecting to the second mobile device.

According to an alternative embodiment, the first interface for a first cable connection may be configured for the first mobile device. The first cable connection may be a serial connection. The second interface may be configured for a second cable connection to the second mobile device. The second cable connection may be a serial connection. The cable connection may be a USB connection.

According to one embodiment, the central unit may be configured for redirection to send a signal for activating a service of the ad hoc call redirection to the service provider. The signal for activation may be generated by the central unit based on the detection of the input. A direct input in the first mobile device is therefore not necessary.

According to one embodiment, the central unit may be configured for call redirection to stream audio signals, associated with the call, between a transceiver and the second mobile device. Preferably, the audio signals are streamed via the second interface.

According to one embodiment, the central unit may be configured to receive the first data of a first SIM card via the first interface from the first mobile device. The central unit may be configured to receive the second data of a second SIM card via the second interface from the second mobile device. A communication can occur over an external antenna of the vehicle by means of the SIM card data and a transceiver for GSM or UMTS or LTE.

According to one embodiment, the central unit may be configured to additionally redirect the call automatically. According to one embodiment, the central unit may be configured to determine a workload level of the driver based on traffic conditions and/or navigation data. The central unit may be configured to estimated one element of a predetermined set of traffic conditions. The central unit may be configured to estimated one element based on measured data of the vehicle's movement. One element of the set of traffic conditions may be "strong deceleration" based on measured speed data. One element of the set of traffic conditions may be "significant steering" based on measured change of the steering angle. Navigation data may be the density of junctions within a predetermined distance in front of the vehicle. Navigation data may be a number of upcoming maneuver points along a route within a predetermined distance to the vehicle. The central unit may be configured to suppress the outputting of the information and to redirect the call automatically or to reject the call, if an exceeding is determined that the workload level exceeds a threshold.

According to one embodiment, the central unit may be configured to generate an audio message or a written message. The central unit may be configured to send the audio message or the written message to the calling party.

According to another aspect a system for a vehicle is provided. The following features may be combined with the aforementioned. The system comprises a central unit. The central unit has a first interface for connecting to a first mobile device. The central unit is configured to assign the first mobile device to a driver of the vehicle. The central unit is configured to estimate one element of a set of traffic situation based on navigation data and/or measured data of the vehicle's movement. The central unit is configured to output an audio message or a written message assigned to the one element. The central unit is configured to send the audio message or the written message to a calling party. The central unit may be configured to send the audio message or written message based on an identification of the calling party. The central unit may be configured to identify the calling party being assigned in the telephone book. The calling party may be the husband. The central unit may be configured to determine from the current position and navigation data, that the driver is heading home. An audio message may be output that the driver is on the way home. The audio message may be sent to the husband accordingly.

The previously described embodiments are especially advantageous both individually and in combination. In this regard, all embodiment features can be combined with one another. Some possible combinations are explained in the description of the exemplary embodiments shown in the figures. These possible combinations of the embodiments, depicted therein, are not definitive, however.

BRIEF DESCRIPTION OF FIGURES

The invention will be described in greater detail hereinafter by exemplary embodiments using graphic illustrations. In the drawing.

DETAILED DESCRIPTION

Figure 1:
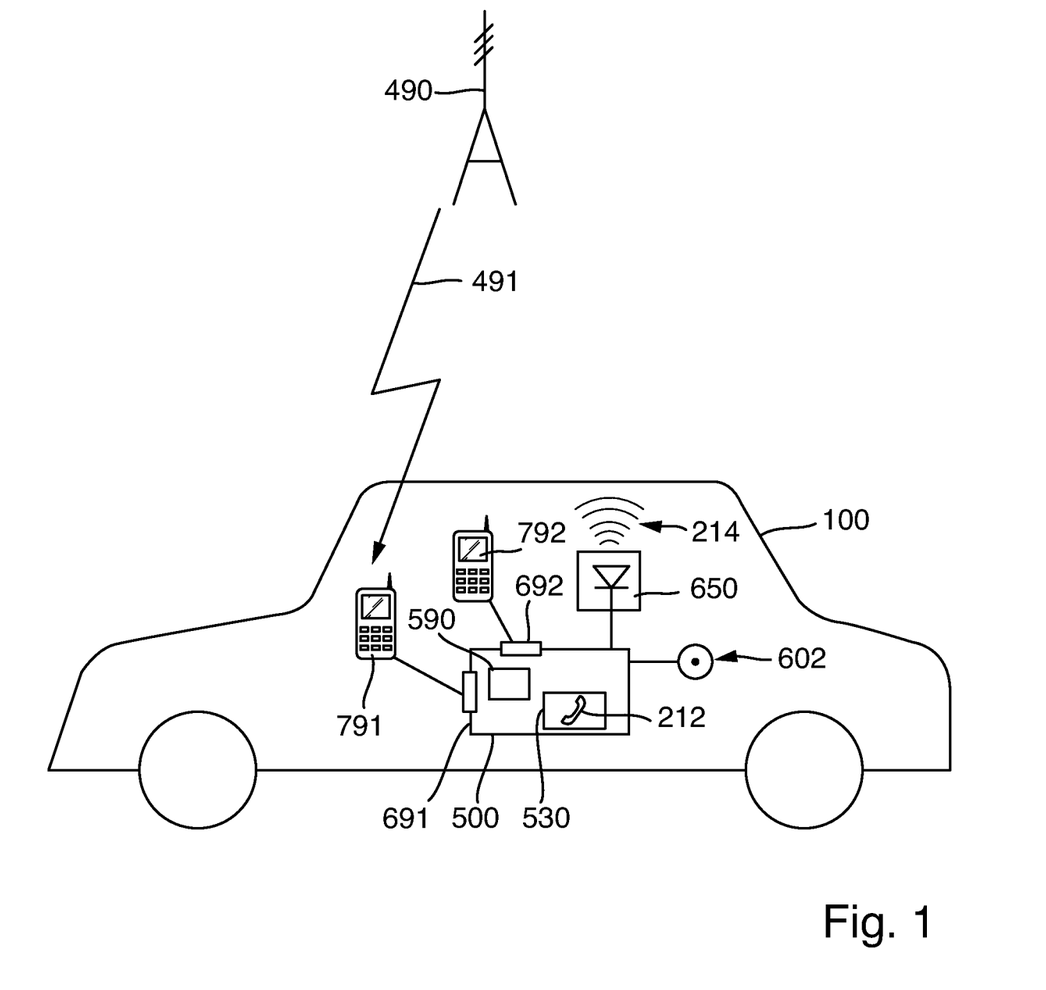
FIG. 1 shows a schematic view of the system in a vehicle.

A system of a vehicle 100, which may be configured to receive telephone calls, is shown schematically in FIG. 1. The system may have a central unit 500 and an input device 602. The system may have a loudspeaker 650 as an output unit. Central unit 500 may have a touchscreen 530. Central unit 500 may have a first interface 691 for connecting to a first mobile device 791, for example, a cell phone or smartphone. The central unit may have a second interface 692 for connecting to a second mobile device 792. First interface 691 and second interface 692 can be configured as a wireless interface or cable interface.

First mobile device 791 may belong to the driver whereas second mobile device 792 may belong to a passenger, for example, the front seat passenger. Neither the driver nor the passenger is shown in the highly simplified illustration of FIG. 1. Central unit 500 may be configured to assign first mobile device 791 to the driver and second mobile device 792 to the passenger in vehicle 100. The assignment may be initiated by central unit 500, in that the central unit carries out a pairing of mobile devices 791, 792, for example, by means of a Bluetooth transceiver. The assignment may be initiated by central unit 500, in that the central unit 500 automatically determines the assignment by means of signal evaluation or measurement evaluation. The assignment may occur alternatively based on an evaluation of user inputs. The assignment may be stored as a table entry.

In one embodiment, central unit 500 may be configured to query the access data, available on the SIM card, in the particular mobile device 791, 792 via the particular interface 691, 692. Central unit 500 may have one or more transceivers 590 (GSM, UMTS, LTE), which directly use the read access data.

In one embodiment of FIG. 1, a call 491 to first mobile device 791 may occur over a base station 490 of an UMTS network. Central unit 500 may be configured to output information 212, 214 on call 491 to first mobile device 791 in the calling phase. In one embodiment of FIG. 1, a symbol 212 may be displayed as information on a touchscreen 530 of central unit 500 and a message 214 may be output as information over loudspeaker 650, which indicate a call 491 to first mobile device 791 at least to the driver in the vehicle. The driver could accept call 491 on mobile device 791. However if the driver's attention is greatly occupied by the current traffic situation, the driver can refuse to take call 491.

An infrared sensor 602 may be connected to central unit 500 as a component of an input device. Simple hand gestures as input by the driver can be recognized by means of infrared sensors 602. Central unit 500 may be configured to detect an input by means of input device 602 during the outputting of information 212, 214. This recognized input may be associated with a function of the system, which offers the driver an alternative for accepting or refusing the call.

Central unit 500 may be configured, based on the detection of the input by input device 602, to redirect ad hoc call 491 to second mobile device 792. With the redirection, second mobile device 792 may show the receiving of the redirected call and optionally information on the redirection. The redirected call can be taken on second mobile device 792, so that distraction of the driver by the call is reduced significantly.

Figure 2:
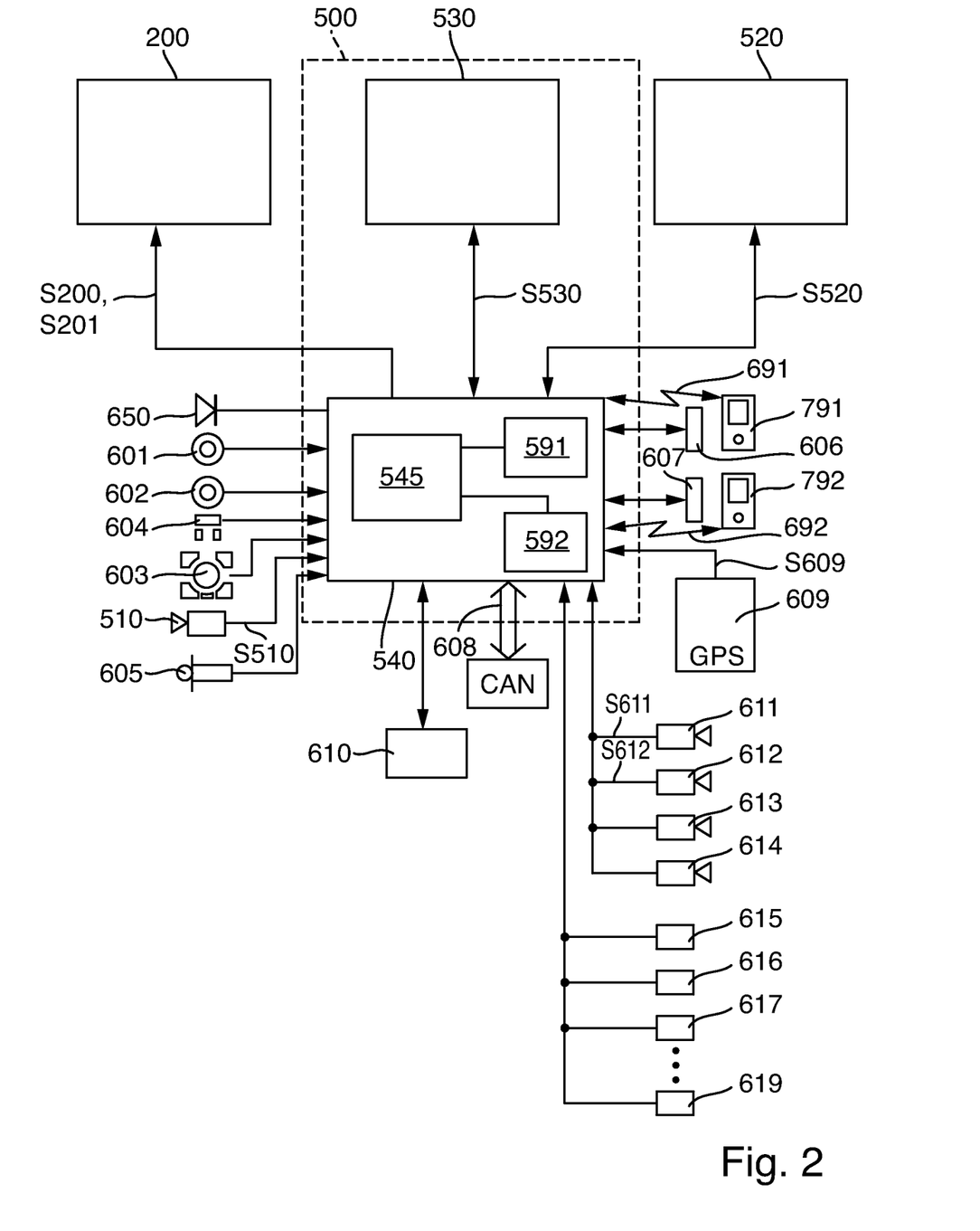
FIG. 2 shows a schematic view of an interior of the vehicle.

FIG. 2 shows a block diagram of an infotainment system. According to one embodiment, the infotainment system may have a central unit 500 comprising a processor to run a program. Central unit 500 may have a plurality of interfaces to connect other devices. A head-up display 200 and/or an instrument cluster display 520 and/or a central information display 530 and/or a first sensor 601 and/or a second sensor 602 and/or a first near field communication device 606 and/or a second near field communication device 607 and/or an input device 603 may be connected to or in communication with central unit 500.

According to one embodiment, an infotainment system of a vehicle may include an imaging system. Infotainment system may have a head-up display 200 and a central information display 530 and a sensor 602 for detecting a user's gestures. Head-up display 200 may also be referred to as a head unit display. The infotainment system may have a central unit 500 connectable to head-up display 200 and to central information display 530 and to sensor 602. Central information display 530 may be locally separated from central unit 500 or may be an integral part of central unit 500.

Figure 3:
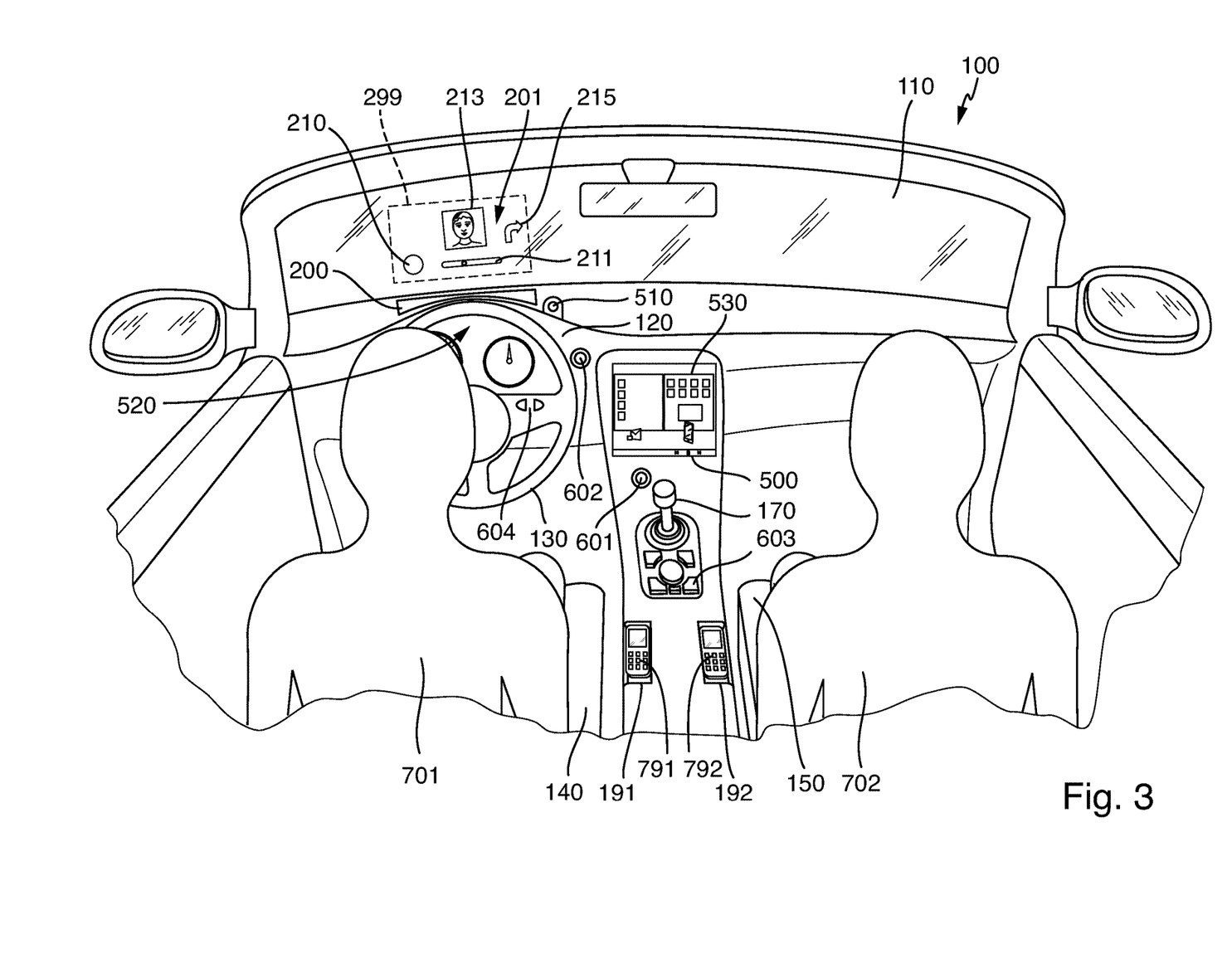
FIG. 3 shows a schematic block circuit diagram.

Central unit 500 may be configured to send first image data S200 to head-up display 200 and second image data S530 to central information display 530 to be displayed. Head-up display 200 may be configured to project an image 201 onto front windshield 110 as shown in FIG. 3. Image 201 may be based on the first image data S200.

According to one embodiment of FIG. 2, central information display 530 may have a screen configured to display an image based on the second image data S530. Central unit 500 may be configured to add content information to the first image data S200 for head-up display 200 and to reduce content information from the first image data S200 for head-up display 200, when a corresponding gesture of the user is detectable by means of sensor 602.

The first image data S200 and second image data S530 may be different. Reduced information included in the first image data S200 are not a strain on the driver; his workload is therefore reduced in comprehending the content of image 201.

According to one embodiment of FIG. 3, image 201 may be projected within an area 299. Projected image 201 may be predefined, and may be adjustable by the user. Area 299 may be positioned toward the view of the driver. The position of area 299 may be adjusted to steering wheel 130, so that image 201 is viewable by the driver while he is also able to observe the traffic in front of the vehicle. Image 201 may be at least partially transparent, for example, semitransparent. At least parts of area 299 may be transparent during driving, so that the driver's view is not disturbed significantly.

According to one embodiment, an infotainment system of a vehicle 100 that includes the imaging system is provided. The infotainment system may have a display, such as head-up display 200, central information display 530, or instrument cluster display 520. The infotainment system may have a sensor 602 for detecting a user's gestures. The infotainment system may have a central unit 500 connectable to head-up display 200, central information display 530, and/or instrument cluster display 520, and/or to sensor 602. Sensor 602 may be of a contactless type. Sensor 602 may be an infrared sensor.

Sensor 602 may be positioned in a predetermined position, such as a dashboard 120 of vehicle 100 toward a steering wheel 130 of vehicle 100. According to one embodiment of FIG. 3, sensor 602 may be positioned in dashboard 120 facing an area of steering wheel 130, where the driver's hands are in a normal position. The driver can therefore easily make gestures while driving vehicle 100. Therefore, the driver does not need to search for sensor 602. According to one embodiment, sensor 602 may be manually positionable by the driver for detecting in a predetermined area.

Central unit 500 and sensor 602 may be configured to distinguish between a gesture to change information content in head-up display 200, central information display 530, and/or instrument cluster display 520, and a steering movement of the user's hand. To distinguish between the gesture and the steering movement corresponding differences in the amplitude of signals of sensor 602 may be analyzed. Central unit 500 may be configured to recognize a predefined steering movement and/or a predefined gesture.

According to one embodiment of FIG. 2, an infotainment system of a vehicle 100 that includes an imaging system is provided. The infotainment system may have first means 606 configured to establish a first connection to a first mobile communication device 791, such as a first mobile phone. The infotainment system may have second means 607 configured to establish a second connection to a second mobile communication device 792 such as a second mobile phone.

The infotainment system may have a central unit 500 connectable to the first means 606 and to the second means 607. Central unit 500 may be configured to manage (incoming and/or outgoing) communication, such as phone calls, of first mobile communication device 791 and second mobile communication device 792 concurrently.

Central unit 500 may be configured to use an access protocol, such as a SIM-Access-Profile (SAP), to access a unique network identification device, such as a SIM card, of first mobile communication device 791 and second mobile communication device 792. This may allow the infotainment system with a built-in GSM transceivers 610 to connect to a SIM card in a mobile phone 791; thus transceiver 610 of vehicle 100 itself does not require a separate SIM card. This profile may also be referred to as rSAP (remote-SIM-Access-Profile).

According to one embodiment in FIG. 2, the system may have a central unit 500 and one or more input devices 601, 602, 603, 604, 605. The system may have a first infrared sensor 601. The system may have a second infrared sensor 602. The system may have a central button panel 603. The system may have a steering wheel button panel 604. The system may have a microphone 605 for inputting spoken audible commands. The system may have an internal camera 510 for recording a user, whereby for recognizing an input from image data S510 of internal camera 510 a user's gesture can be detected by central unit 500.

According to one embodiment, central unit 500 may have a first interface 691 for connecting to a first mobile device 791 and a second interface 692 for connecting to a second mobile device 792. According to one embodiment of FIG. 2, first interface 691 may be made as a wireless interface and the second interface likewise as a wireless interface. To form first wireless interface 691, central unit 500 may have a first transceiver 591, particularly a Bluetooth transceiver. To form second wireless interface 692, central unit 500 may have a second transceiver 592, particularly a Bluetooth transceiver.

According to one embodiment, the system may have a first near field communication transmitter 606, which may be arranged closer to the driver than to the passenger. The system may have in addition a second near field communication transmitter 607, which may be arranged closer to the passenger than to the driver. An identification of first mobile device 791 can be transmitted to central unit 500 via first near field communication transmitter 606. An identification of second mobile device 792 can be transmitted to central unit 500 via second near field communication transmitter 607. Central unit 500 may be configured to assign first mobile device 791 to the driver and second mobile device 792 to a passenger in vehicle 100.

According to one embodiment in FIG. 3, a first retainer 191 for first mobile device 791 may be positioned toward driver 701, and a second retainer 192 for second mobile device 792 may be positioned toward passenger 702. The first near field communication transmitter 606 may be positioned toward first retainer 191 and second near field communication transmitter 606 toward second retainer 192.

According to one embodiment, central unit 500 may be configured to output information 213 on a call to first mobile device 791 in the calling phase. According to one embodiment, the system may have a head-up display 200 and/or instrument cluster display 520 and/or a central information display 530 for visually outputting the information, for example, in the form of a symbol. To this end, central unit 500 may send associated image data S200 to head-up display 200 and/or associated image data S520 to instrument cluster display 520 and/or associated image data S530 to central information display 530. According to one embodiment, the system may have a loudspeaker 650 for acoustic outputting of the information, for example, in the form of a ring tone.

According to one embodiment, central unit 500 may be configured to detect an input by means of the input device in the calling phase, therefore during the outputting of the information via display 200, 530, 520 and/or loudspeaker 650. The input can be detected especially simply as gestures by means of an infrared sensor 601, 602. It is likewise possible to detect the input by button depression in a panel field 603, 604 or by voice input over a microphone. The input device in this case can have one or more input elements 510, 601, 602, 603, 604.

According to one embodiment, central unit 500 may be configured, based on the detection of the input, to redirect ad hoc the call to second mobile device 792. In addition, other input options for accepting or refusing the call can be provided.

Various technical solutions will be explained below for redirecting the call. A circuit 540 of central unit 500 may have for the redirecting function a telephone management function block 545, which may have the conventional functionalities of a mobile device, particularly a mobile telephone. To transfer communication data S610 from and to a wireless network, circuit 540 may be connected to a transceiver 610, for example, for communicating with a GSM or UMTS network.

According to one embodiment, central unit 500 may be configured for the purpose of redirection to send a signal to activate a service of the ad hoc call redirection to the service provider. The service provider may have a server with the functionality of ad hoc call redirection. With the redirection, the call may be indicated on second mobile device 792 and can be taken directly on second mobile device 792.

According to one embodiment, central unit 500 may have a first wireless transceiver 591 for connecting to first mobile device 791. Central unit 500 may have a second wireless transceiver 592 for connecting to second mobile device 792. Wireless transceiver 592 may be configured for bidirectional streaming of digital audio signals. According to one embodiment, central unit 500 may be configured, for the purpose of call redirection, to stream audio signals associated with the call between second transceiver 592 and second mobile device 791 over second interface 692. In this case, second interface 692 may be configured as a wireless interface.

According to one example of FIG. 2, there may be two sensors 601, 602 sensing the movements of a user's hand. The two sensors 601, 602 may be both connected to central unit 500. An interior camera 510 may be connected to central unit 500. Interior camera 510 may be aligned to record a face of the user, especially the face of the driver of vehicle 100 to determine eye movements.

According to one embodiment, the infotainment system may have a microphone 510 to record the voice of the user. The infotainment system may be configured to run a voice recognition program. The infotainment system may have an interface 608 to a CAN bus of vehicle 100 to retrieve data of vehicle 100, e.g., the current speed, vehicle rain sensor data, and so forth.

The infotainment system may have a satellite receiver 609 to receive position data S609 of the current position of vehicle 100, such as GPS data or GLONASS data S609.

The infotainment system may have one or more cameras 611, 612, 613, 614 positioned to record an image of the surroundings of vehicle 100. According to one embodiment, central unit 500 may be connected to a front camera 611 capturing image data S611 of the road and traffic in front of vehicle 100. Central unit 500 may be connected to a back camera 612 capturing image data S612 of the road and traffic behind vehicle 100. Central unit 500 may be connected to a left camera 613 and/or to a right camera 614 recording an image correspondingly. The one or more cameras 611, 612, 613, 614 may be used to record a complete surroundings of vehicle 100 concurrently. Central unit 500 may be configured to run an object recognition program to recognize objects, such as road users like a vehicle, in the recorded image data.

The infotainment system may have one or more distance sensors 615, 616, 617, 619. Distance sensors 615, 616, 617, 619 may be ultrasonic sensors or radar sensors, or any other device or system for measuring distance in the surroundings of vehicle 100. Distance sensor 615, 616, 617, 619 may be connectable to central unit 500.

According to one embodiment, an imaging system may be provided in connection with an infotainment system of a motor vehicle 100. FIG. 3 shows a schematic representation of an example of a vehicle interior. According to one embodiment of FIG. 3, vehicle 100 may include a driver seat 140 and a passenger seat 150. Vehicle 100 may further include a steering wheel 130 on the driver's side and a gear shift 170 and a front windshield 110. According to one embodiment of FIG. 3, an infotainment system may be provided. The infotainment system may have an information display 530 in the form of a user interface. Central information display 530 may be centrally arranged in dashboard 120 of vehicle 100. Central information display 530 may be touchscreen, comprising a touch-sensitive surface for user input.

The infotainment system may have an instrument cluster display 520. In one embodiment, instrument cluster display 520 may be arrange in-line with the position of steering wheel 130, so that the user may see the displayed information content through openings of steering wheel 130. Instrument cluster display 520 may be a color screen. The infotainment system may have a head-up display 200. The head-up display 200 may be configured to project an image 201 onto front windshield 110. A surface of front windshield 110 may reflect the projected image toward the user, in case of one embodiment of FIG. 3, toward the driver 701 of vehicle 100. Front windshield 110 can be extended by a so-called combiner (not shown). The combiner consists of a reflecting translucent pane. The combiner overlays or combines information about the environment with that of image 201 artificially created by head-up display 200. The combiner in this case can be distanced from the front windshield 110. Likewise, the combiner can be integrated into front windshield 110.

In one embodiment shown in FIG. 3, projected image 201 can be of the size of a reflection area 299. The form of front windshield 110 may deviate from a flat reflection surface, and an electronic rectification and/or optical rectification may be used.

The infotainment system may have a first sensor 601 and a second sensor 602. First sensor 601 and a second sensor 602 may be infrared-sensor. First sensor 601 and a second sensor 602 can be positioned in predetermined locations, such as to sense a movement of a hand of a user 701 of vehicle 100. The infotainment system may have an input device 603, 604. Input device 603, 604 may be part of the user interface, and may have one or more push-buttons, input wheels and so forth.

The infotainment system may have a first near field communication device 606 in a predetermined position, such as near a left retainer 191, according to one embodiment of FIG. 3. The infotainment system may have a second near field communication device 607 in a predetermined position, such as near a right retainer 192, according to one embodiment of FIG. 3. First near field communication device 606 and second near field communication device 607 can be configured to connect to a mobile device 791, 792, such as to a mobile phone, or other mobile communication device in close proximity.

Therefore a mobile device 791 positioned in or near left retainer 191 of one embodiment shown in FIG. 3 can have a connection to first near field communication device 606 and a mobile device 792, positioned in or near right retainer 192 shown in FIG. 3, can have a connection to second near field communication device 607.

In FIG. 3, image 201 of head-up display 200 is shown schematically. According to one embodiment, image 201 may include a plurality of items 210, 211, 215, for example, for navigation, which may be configured as widgets. In one embodiment of FIG. 3, image 201 may show graphical information 213 about a call 491 (shown in FIG. 1), which may be directed to mobile device 791 of driver 701. The graphical information may have the telephone number of the caller and/or a picture of the caller and optionally a symbol, which may be associated with the currently incoming call 491. If driver 701 does not wish to take the call 491, for example, because of a complicated traffic situation, and also not to reject it, driver 701 according to one embodiment can forward ad hoc call 491 to passenger 702. Sensor 602 in the situation of call 491 may be preset for the redirection function. If driver 701 makes a swipe gesture to the right, call 491 may be redirected by central unit 500 to mobile device 792 of passenger 701.

Figure 4:
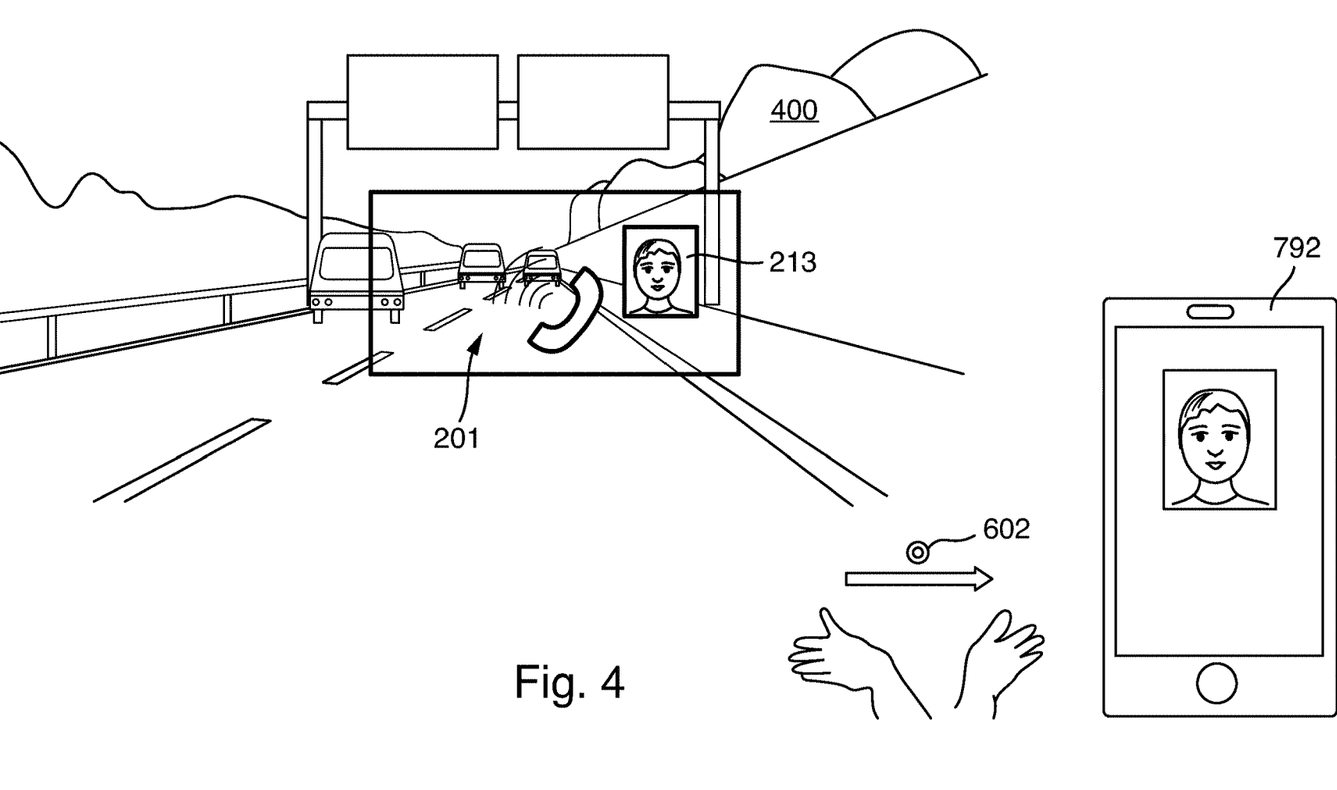
FIG. 4 shows a schematic illustration of a driver's view.

According to one embodiment of FIG. 4, an infotainment system of a vehicle 100 that includes an imaging system is provided. The infotainment system may have a central unit 500 configured to redirect a phone call from a first mobile device 791 of the driver 701 to a second mobile device 792 of a passenger 702. Central unit 500 may be configured to redirect the call, if an associated gesture of a hand of the driver 701 is detected by means of a sensor 602, so that in the case of an incoming call 491, phone call 491 is swiped away to the passenger's smartphone as initiated by the detected input via sensor 602. According to one embodiment in FIG. 4, a view through front windshield 110 into the surroundings 400 of vehicle 100 is shown schematically. Image 201 projected onto front windshield 110 has information 213 on the caller. In addition, a symbol for an incoming call is shown schematically. The call is redirected to second mobile device 792 by a swipe gesture at sensor 602 on the dashboard. In one embodiment of FIG. 4, second mobile device 792 also shows information 213 after a completed redirection.

According to one embodiment, an infotainment system of a vehicle 100 that includes an imaging system is provided. The infotainment system may have a head-up display 200. The infotainment system may have a central unit 500 connectable to head-up display 200. Central unit 500 may be configured to send image data S200 to head-up display 200 to be displayed. Head-up display 200 may be configured to project an image 201 onto a front windshield 110. Image 201 may be based on image data S200.

Central unit 500 may be configured to output a graphic (picture, text). Central unit 500 may be configured to size the graphic within image data S200.

Central unit 500 may be configured to move the graphic within image data S200, so that the graphic is moved from a central position to an edge area of image data 201.

Figure 5:
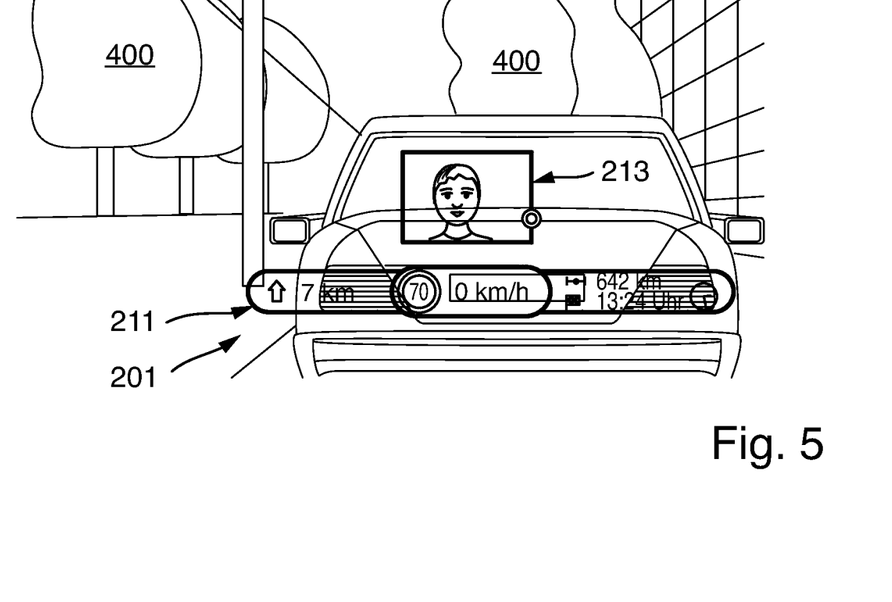
FIGS. 5 and 6 show a further schematic illustration of a driver's view.
Figure 6:
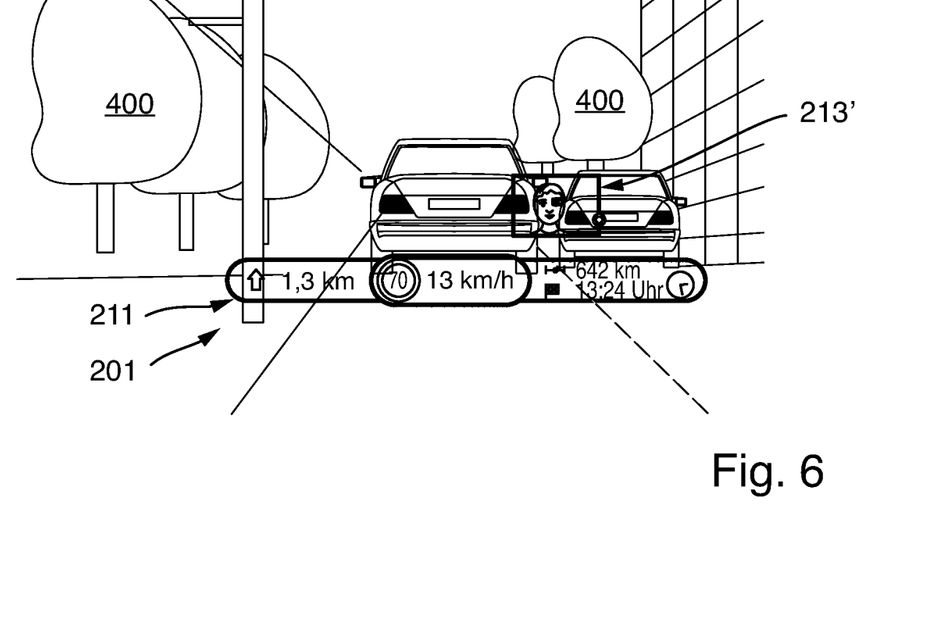

According to one embodiment of FIG. 5 and FIG. 6, a graphic 213 is first centrally displayed. Graphic 213 is an information item corresponding to an incoming phone call 491.

FIGS. 5 and 6 show a view of driver 701 through front windshield 201 into the vehicle surroundings 400. Image 201 of a head-up display is shown overlaid, whereby in FIGS. 5 and 6 image 201 is emphasized by bold type. In one embodiment of FIG. 5, information 213 may be included on an incoming call. Shown is a picture of the caller retrieved from the telephone directory.

According to one embodiment in FIG. 6, a change of image 201 after a call redirection to mobile device 792 of passenger 702 is shown schematically. To reduce the impairment of the view for driver 701, the information image 213 may be made smaller and optionally moved to a side edge of image 201. In addition, the transparency of image 213 can be reduced.

The invention is not limited to the embodiments shown in FIGS. 1 through 6. For example, it is possible to provide a different realization of the redirection, for example, when the Bluetooth standard enables telephone connections to a plurality of devices at the same time, so that central unit 500 performs the function of a telephone system. The functionality of the system according to FIG. 2 can be used especially advantageously for a universal infotainment system of a motor vehicle.

List of Reference Characters

100 Vehicle
110 Front windshield
120 Dashboard
130 Steering wheel
140, 150 Seat
170 Gear shift
191, 192 Retainer
200 Head-up display
201 Image
210, 211, 212, 213, 213', Image element, widget
215
214 Acoustic information
299 Area
400 Surroundings
490 Base station, wireless network
491 Call
500 Central unit
510 Internal camera
520, 530 Display
540 Circuit
545 Function block
590, 591, 592 Transceiver
601, 602 IR sensor
603, 604 Button panel
605 Microphone
606, 607 Near field communication device
608 Vehicle interface
609 Satellite receiver, GPS
610 Transceiver, GSM, UMTS
611, 612, 613, 614 Camera
615, 616, 617, 619 Radar sensor
650 Loudspeaker
691, 692 Interface
701 Driver
702 Passenger
791, 792 Mobile device, mobile telephone, smartphone
S200, S510, S520, S530, Signal
S610, S611, S612

The invention claimed is:

1. A system for a vehicle, comprising a central unit, a first nearfield communication device, a second near field communication device and an input device,
wherein the central unit has a first interface for connecting to a first mobile device and a second interface for connecting to a second mobile device,
wherein the central unit is configured to assign the first mobile device to a driver and the second mobile device to a passenger in the vehicle,
wherein the central unit is configured to output information on a call directed to the first mobile device to at least one of:
a display of the vehicle as graphical data, and
at least one loudspeaker of the vehicle as an audio signal,
wherein the central unit is configured to detect, responsive to the output of the information, a user input by means of the input device during the outputting of the information,
wherein the central unit is configured to accept, reject, and redirect the call based on the detection of the user input, including being configured to perform an active, call-specific, ad hoc redirection of the call to the second mobile device based on the detection of the user input being a gesture input, and further being configured to one of reject and accept the call alternatively thereto,
wherein the central unit is configured to assign the first mobile device, coupled to the first near field communication device, to the driver, and
wherein the central unit is configured to assign the second mobile device, coupled to the second near field communication device, to the passenger,
wherein the first near field communication device is positioned toward a first retainer for the first mobile device, and
wherein the second near field communication device is positioned toward a second retainer for the second mobile device.

2. The system according to claim 1,
wherein the central unit is configured to change the information after the redirection of the call.

3. The system according to claim 1,
wherein the first interface is configured for a first wireless connection to the first mobile device, and
wherein the second interface is configured for a second wireless connection to the second mobile device.

4. The system according to claim 1,
wherein the central unit is further configured for redirection to send a signal for activating a service of the ad hoc call redirection to a service provider.

5. The system according to claim 1,
wherein the central unit is further configured for call redirection to stream audio signals, associated with the call, between a transceiver and the second mobile device.

6. The system according to claim 1,
wherein the central unit is further configured to receive first data of a first SIM card via the first interface from the first mobile device, and
wherein the central unit is further configured to receive second data of a second SIM card via the second interface from the second mobile device.

7. The system according to claim 1, wherein the graphical data comprises at least one of a telephone number of a caller, a picture of the caller, and a symbol associated with an incoming call.

8. A system for a vehicle, comprising a central unit and an input device,
wherein the central unit has a first interface for connecting to a first mobile device and a second interface for connecting to a second mobile device,
wherein the central unit is configured to assign the first mobile device to a driver and the second mobile device to a passenger in the vehicle,
wherein the central unit is configured to output information on a call directed to the first mobile device to at least one of:
a display of the vehicle as graphical data, and
at least one loudspeaker of the vehicle as an audio signal,
wherein the central unit is configured to detect, responsive to the output of the information, a user input by means of the input device during the outputting of the information,
wherein the central unit is configured to accept, reject, and redirect the call based on the detection of the user input, including being configured to perform an active, call-specific, ad hoc redirection of the call to the second mobile device based on the detection of the user input being a gesture input, and further being configured to one of reject and accept the call alternatively thereto,
wherein the input device has a sensor for contactless input,
wherein the user input comprises a hand gesture,
wherein the sensor is arranged in a dashboard of the vehicle facing an area of a steering wheel of the vehicle, and
wherein the central unit and the sensor are configured to distinguish between the user input and a steering movement of a hand.

9. A system for a vehicle, comprising a central unit and an input device,
wherein the central unit has a first interface for connecting to a first mobile device and a second interface for connecting to a second mobile device,
wherein the central unit is configured to assign the first mobile device to a driver and the second mobile device to a passenger in the vehicle,
wherein the central unit is configured to output information on a call directed to the first mobile device to at least one of:
a display of the vehicle as graphical data, and
at least one loudspeaker of the vehicle as an audio signal,
wherein the central unit is configured to detect, responsive to the output of the information, a user input by means of the input device during the outputting of the information,
wherein the central unit is configured to accept, reject, and redirect the call based on the detection of the user input, including being configured to perform an active, call-specific, ad hoc redirection of the call to the second mobile device based on the detection of the user input being a gesture input, and further being configured to one of reject and accept the call alternatively thereto,
wherein the central unit is configured to output the information via an information image presented on the display,
wherein the central unit is further configured to additionally redirect the call automatically, and
wherein, responsive to redirecting the call, the central unit is configured to reduce impairment of a view of a driver of the vehicle by making the information image smaller and moving a position of the information image.

10. The system according to claim 1,
wherein the central unit is further configured to determine a workload level of the driver based on estimated traffic conditions and/or navigation data, and
wherein the central unit is further configured to suppress the outputting of information and to redirect the call automatically or to reject the call, when the workload level is determined to exceed a threshold.

11. The system according to claim 10,
wherein the central unit is further configured to generate an audio message or a written message and to send the audio message or the written message to a calling party.

12. A system for a vehicle, comprising a central unit and an input device,
wherein the central unit has a first interface for connecting to a first mobile device and a second interface for connecting to a second mobile device,
wherein the central unit is configured to assign the first mobile device to a driver and the second mobile device to a passenger in the vehicle,
wherein the central unit is configured to output information on a call directed to the first mobile device to at least one of:
a display of the vehicle as graphical data, and
at least one loudspeaker of the vehicle as an audio signal,
wherein the central unit is configured to detect, responsive to the output of the information, a user input by means of the input device during the outputting of the information,
wherein the central unit is configured to accept, reject, and redirect the call based on the detection of the user input, including being configured to perform an active, call-specific, ad hoc redirection of the call to the second mobile device based on the detection of the user input being a gesture input, and further being configured to one of reject and accept the call alternatively thereto,
wherein the input device comprises at least one of an infrared sensor and a camera, wherein the user input comprises a swipe gesture sensed by one or more of the infrared sensor and the camera during the outputting of information by the central unit, and wherein the active, call-specific, ad hoc redirection of the call to the second mobile device is initiated by the swipe gesture that is detected via the input device.

13. The system according to claim 12, wherein the input device comprises a first infrared sensor and a second infrared sensor, wherein the swipe gesture is a hand gesture that is sensed by at least the first infrared sensor, and wherein the central unit is configured to associate the first infrared sensor with a preset for a redirection function as an alternative for accepting or refusing the call.

* * * * *

UNITED STATES PATENT AND TRADEMARK OFFICE
CERTIFICATE OF CORRECTION

| | | |
|---|---|---|
| PATENT NO. | : 11,008,017 B2 | Page 1 of 1 |
| APPLICATION NO. | : 14/654441 | |
| DATED | : May 18, 2021 | |
| INVENTOR(S) | : Roth et al. | |

It is certified that error appears in the above-identified patent and that said Letters Patent is hereby corrected as shown below:

On the Title Page

Item (72) Inventor ADD:
--Kelei Shen, Dulach, DE;
Michael Reuss, Bretten, DE;
Alexa Wackernagel, Vilters, CH;
Stephan Bergmann, Muggensturm, DE;
Stefan Marti, Oakload, CA--.

Signed and Sealed this
Ninth Day of July, 2024

Katherine Kelly Vidal
*Director of the United States Patent and Trademark Office*